Figure 1:
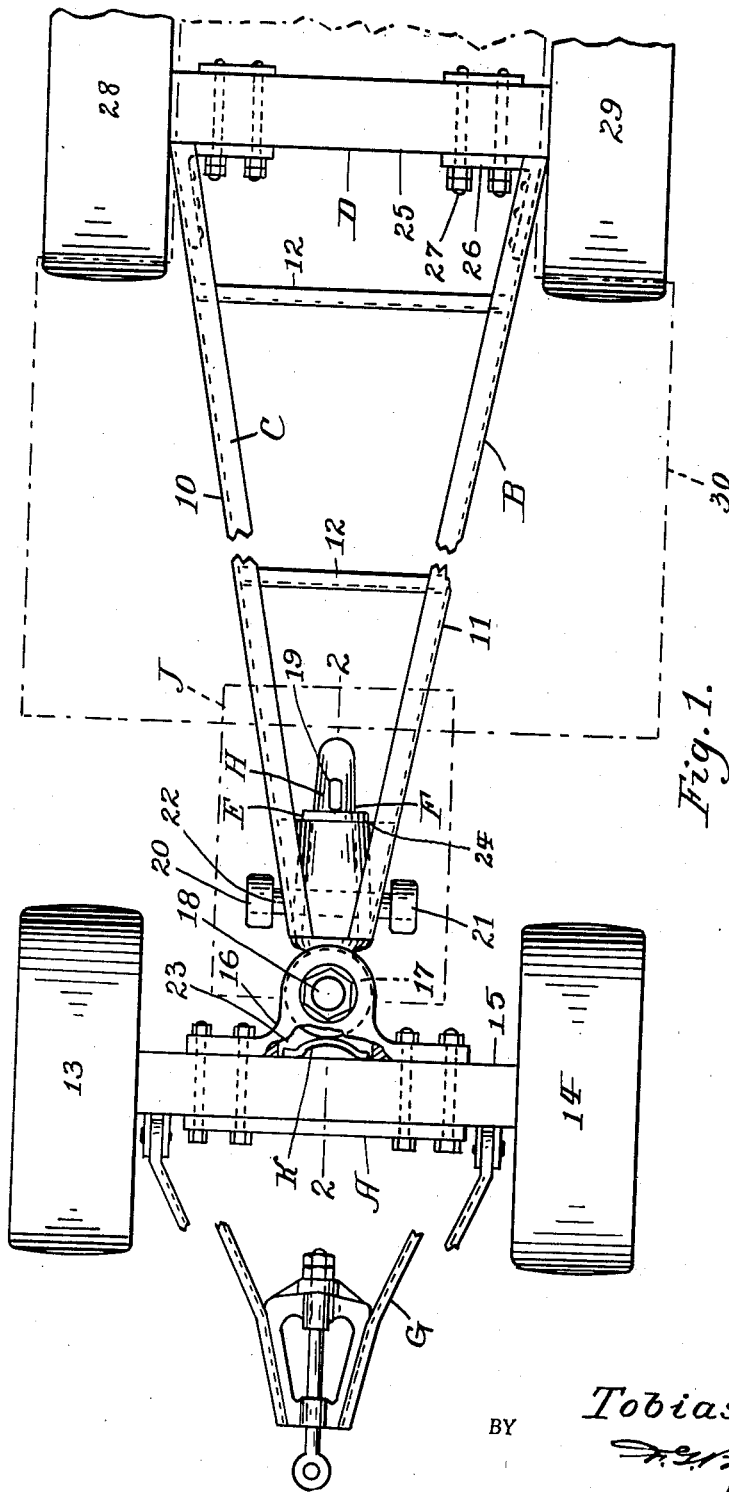

Nov. 16, 1943.　　　　T. WEBER　　　　2,334,522
TANK TRAILER
Filed March 11, 1942　　　3 Sheets-Sheet 1

INVENTOR.
Tobias Weber,
BY
Attorney

Nov. 16, 1943.  T. WEBER  2,334,522
TANK TRAILER
Filed March 11, 1942  3 Sheets-Sheet 2
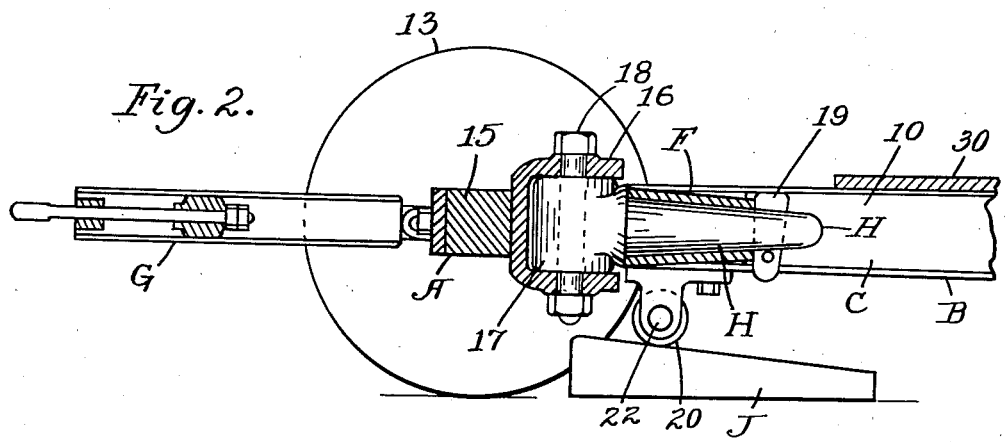
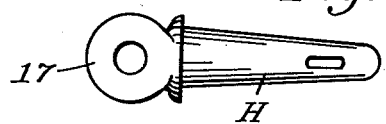
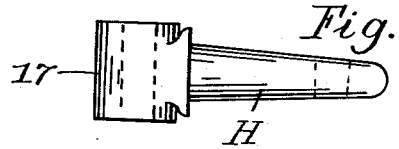
INVENTOR.
BY Tobias Weber,
Attorney.

Nov. 16, 1943.  T. WEBER  2,334,522
TANK TRAILER
Filed March 11, 1942   3 Sheets-Sheet 3
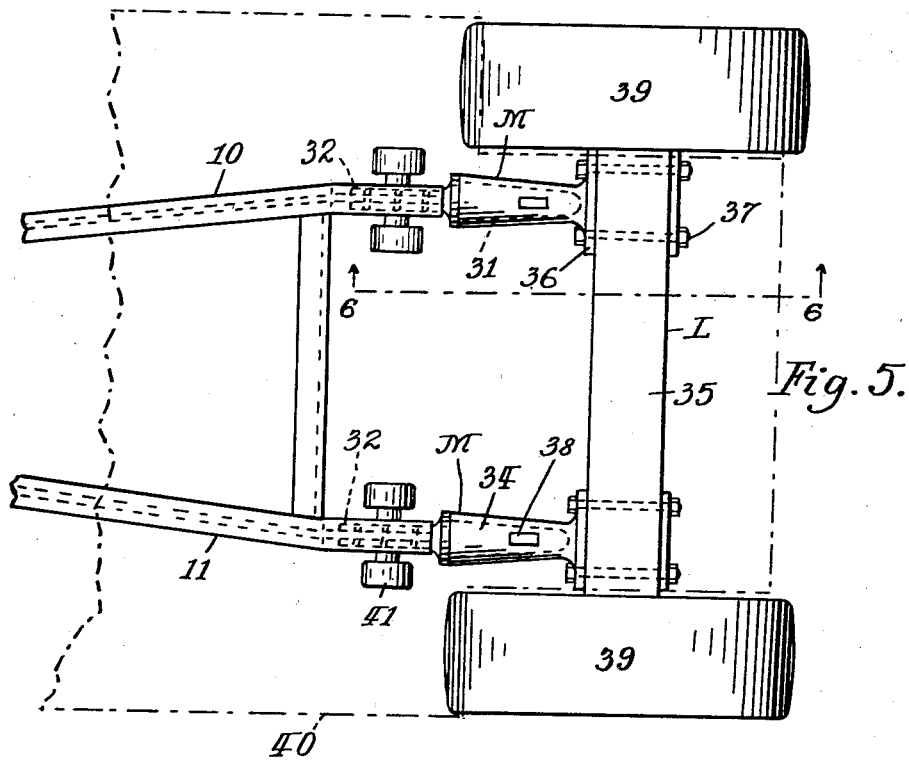
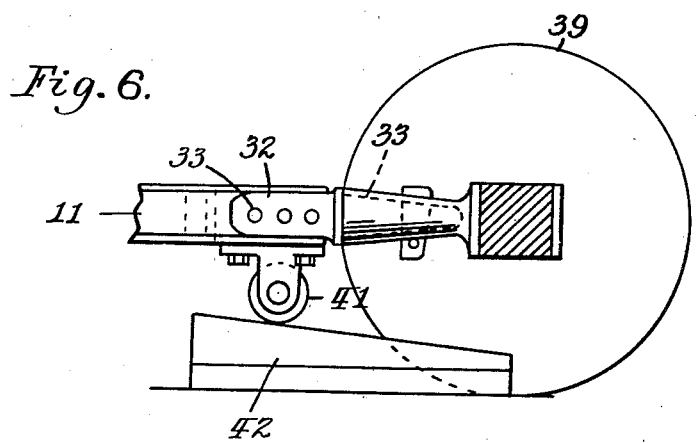
INVENTOR.
Tobias Weber,
BY
Attorney Patented Nov. 16, 1943

2,334,522

UNITED STATES PATENT OFFICE 2,334,522

TANK TRAILER

Tobias Weber, Los Angeles, Calif., assignor to Lydia A. Weber, Los Angeles, Calif.

Application March 11, 1942, Serial No. 434,207

5 Claims. (Cl. 280—140)

My invention relates to improvements in tank trailers, the primary object being to provide a trailer which is of low elevation and therefore adapted for moving heavy loads such as tanks, machine guns and other objects. A further object is to provide simple and effective means for coupling or uncoupling the front or rear ends of the trailer body or both to or from suitable carrying elements, whereby the trailer body is readily adapted for use in surmounting obstacles, angles and other difficulties which are encountered in transporting tanks, machine guns and other heavy objects from place to place and over rough terrain and for more readily using the trailer body as an emplacement foundation when the carrier elements are removed. Among further objects is the provision of a body frame in a trailer which is of maximum simplicity, strength, stability and effectiveness in use and which can be readily jacked up to relieve binding tendency between the parts of the coupling means so that the latter can be more easily uncoupled while the trailer body frame remains normal.

In the accompanying drawings, forming part of this specification, Fig. 1 is a plan of my improved trailer when the forward end is constructed with a coupling element for cooperation with a leading carrier element while the rear end is permanently mounted upon an ordinary carrier; Fig. 2 is a longitudinal vertical section of a detail taken on the line 2—2 of Fig. 1; Fig. 3 is a plan of the rearwardly tapering coupling pin used in the structure shown in Fig. 1; Fig. 4 is a side elevation of the coupling pin shown in Fig. 3; Fig. 5 is a plan of the rear end of the trailer when constructed with a readily detachable carrier; and Fig. 6 is a section taken on the line 6—6 of Fig. 5.

Generally stated, the invention embodies a trailer of unique type and which is adapted to have the forward end of its bed frame supported by and separably coupled to the rear end of a leading wheel carrier and its rearward end either permanently supported by a wheel carrier or detachably coupled to and supported by a separable wheel carrier, said trailer being equipped with usual brakes and signals or other incidental features, not shown.

Referring particularly to Figs. 1 to 4 inclusive, A indicates a portion of a leading wheel carrier which may be of any construction desired, and B my improved trailer which has a low bed or chassis frame C supported at its rearward end by a permanently attached wheel carrier D. The bed frame is composed of a pair of forwardly converging side bars 10 and 11, which are spaced apart and cross braced by members 12, the latter being united by welding or other suitable means to the side bars with the socket shell E of a separable coupling F at its apex extremity. The socket shell E is formed with a gusset plate 24, which is secured by welding or other suitable means to the side bars of the chassis frame C.

The leading carrier A may be of any construction desired, either power driven to act as a tractor or connected by the reach G to a power driven vehicle of any type. As shown it consists of a pair of carrier wheels 13 and 14 journaled upon the opposite ends of an axle 15, which latter carries at its median portion a rearwardly extending rigid coupling bracket or clevis 16, in which the head 17 of the integral coupling pin H is secured by the vertical king bolt 18 so that said coupling pin is free to swing rearwardly from the vertical king bolt in a horizontal plane but is restrained from swinging in a vertical plane.

The coupling pin H extends and tapers rearwardly from its head 17 and swivels in the correspondingly tapered socket shell E in the coupling F. In this manner the swivel connection provided by the separable coupling permits free transverse rotation between the trailer and the forward carrier in addition to a free swinging movement in a horizontal plane provided by the king bolt 18. A tapering key or keeper 19 is removably inserted downwardly through the rearwardly projecting end of the coupling pin H to hold the members E and H rotatably united. Thus by removing the key the tractor member A and trailer member B can be uncoupled and separated.

Previous to uncoupling the forward end, the trailer frame can be supported to relieve all strain caused by the load on the coupling element by one or more antifriction jack or skid rollers such as 20 and 21, which are journaled on a transverse jack shaft 22, said shaft in turn being supported below the trailer frame. By placing a block such as J on the ground with its surface disposed in an inclined plane (see Fig. 2) and in the longitudinal path of the rollers, the trailer can be driven forwardly or backwardly to raise the trailer frame into normal position until substantially all weight and binding tendency is relieved from the separable coupling, whereupon the key can be withdrawn and the leading carrier element driven away to permit free loading or unloading of the body frame.

As a further improved feature a friction spring

K is seated in the recess 23 in the clevis 16 on the forward carrier axle 15 and impressed against the side of the head 17 of the coupling pin H, whereby the lead carrier tends to remain in any position it assumes laterally when swung upon its king bolt. This feature prevents the forward carrier from swinging too freely on the king bolt when set in any of its positions.

The permanently attached rear carrier element D consists of a transverse axle 25 which is secured rigidly to the rearward ends of the side bars 10 and 11 such as by the brackets 26 and bolts 27. Carrier wheels such as 28 and 29 are shown journaled on the opposite ends of said axle. A platform of suitable type and construction, such as 30 is shown mounted upon the bed frame.

It is contemplated within the spirit of the invention to provide, when desired, a detachable carrier element on the rear end of the chassis frame as shown in Figs. 5 and 6, instead of the permanent carrier set forth in Figs. 1 to 4 inclusive. When thus provided with rear detachable carrier means each side bar 10 and 11 has its rear extremity provided with the rigidly secured rearwardly tapering male coupling pin 31 which is attached thereto by flanges and rivets 32 and 33 or other suitable means. A forwardly extending corresponding socket element 34 is rigidly mounted upon the rear axle 35 of the rear carrier element by a flanged base 36 and bolts 37. The rearward end of the side bars 10 and 11 composing a reach, are struck inwardly to form longitudinal supports for the rigidly held coupling pins 31, parallel with the longitudnal center line of the vehicle frame structure so that the coupling pins and the rigidly held corresponding socket members 34 will coincide freely and when united form an immovable coupling means while permitting the parts of the coupling to readily function when connecting or separating. In this manner a pair of separable couplings is provided between the rear end of the bed frame and the carrier element by which the rearward carrier element can be immovably connected to or released from the frame. A detachable key 38 is thrust downwardly through the shell of the socket 34 and coupling pin for locking the male and female elements of the coupling together.

The rear carrier element like in the construction shown in Fig. 1 is provided with carrier wheels 39 on its opposite ends and the bed frame has a platform 40 for supporting a load. Also each side bar of the chassis frame has a pair of jack or skid rollers 41 for use in raising the load of the frame on an inclined block 42 to relieve the strain imparted by the load between the elements of each coupling so that the keys can be easily withdrawn and the coupling elements released.

While I have shown in the drawings the preferred embodiment of the invention, it will be understood that I do not intend thereby to be limited to the exact form disclosed but aim to cover all modifications and alternative constructions falling within the spirit and scope of the invention and expressed in the appended claims.

I claim:

1. A trailer having a bed frame, a carrier at each of the forward and rearward ends of said frame, and means for separably coupling the forward end of said bed frame to said forward carrier, consisting of a rearwardly extending pin pinioned to said forward carrier and adapted to swing in a horizontal plane but restrained from swinging on said forward carrier in a vertical plane, a forwardly extending rearwardly tapering socket rigidly seated in the forward end of said body frame and in which said pin is swiveled to permit free transverse rotary movement of said body frame and removable key engaging means between said pin and socket for uniting the coupling elements.

2. A trailer having a bed frame composed of side bars converging together forwardly, a carrier at each of the forward and rearward ends of said frame, and means for separably coupling the forward end of said bed frame to said forward carrier, consisting of a rearwardly extending pin pinioned to said forward carrier to swing in a horizontal plane but restrained from swinging on said forward carrier in a vertical plane, a forwardly extending rearwardly tapering socket shell seated in the forward apex of said body and in which said pin is swiveled to permit free transverse rotary movement of said body frame on the forward carrier and removable key engaging means between said pin and socket shell for uniting the coupling elements.

3. A trailer having a bed frame composed of side bars converging together forwardly, a carrier at each of the forward and rearward ends of said frame, means for separably coupling the forward end of said frame to said forward carrier, consisting of a rearwardly extending pin, a clevis mounted upon the forward carrier in which one end of said pin is vertically pinioned to swing in a horizontal plane, said pin tapering rearwardly from its pinioned support, a companion socket shell tapering rearwardly and rigidly supported in the apex end of said body frame and in which said pin is adapted to swivel, removable key engaging means for holding said pin and socket coupled together and resilient friction means seated in said clevis and impressed against the pinioned end of the coupling pin to retard free swinging movement of the body frame about said vertical pinion.

4. A vehicle having a bed frame composed of longitudinal side bars provided with substantially parallel rear end portions, a carrier at each of the forward and rearward ends of said frame, said rearward carrier having a transverse axle and carrier wheels on the opposite ends of said axle, and means for separably coupling the rearward ends of said side bars to said rearward carrier consisting of a separable coupling interposed between the rearward end of each side bar and said axle, said coupling consisting of a longitudinal pin rigidly supported by the side bar, a companion socket rigidly supported on said axle and removable key engaging means for securing said rigidly supported coupling elements together, the axes of said couplings being arranged substantially parallel with the longitudinal center line of the bed frame, whereby the members of the couplings when united provide readily separable immovable coupling means.

5. A vehicle having a bed frame composed of a pair of longitudinal side bars provided with substantially parallel rear end portions, a carrier at each of the forward and rearward ends of said frame, said rearward carrying means having a transverse axle and carrier wheels on the opposite ends of said axle, and means for separably coupling the rearward ends of said side bars to said rearward carrier consisting of a pair of separable couplings, one coupling being interposed between the rearward end of each side bar and said axle, said coupling consisting of a rearwardly tapering pin rigidly supported from the rearward end of the side bar, a companion socket shell tapering rearwardly and rigidly supported from said axle in which said pin is adapted to seat tightly and removable key engaging means for holding said coupling elements tightly secured together, said couplings being disposed with their longitudinal axes parallel with the longitudinal center line of said frame, whereby the members of the couplings when united provide readily separable and immovable coupling means.

TOBIAS WEBER.